C. PIEZ.
CONVEYING SYSTEM.
APPLICATION FILED JUNE 5, 1915.

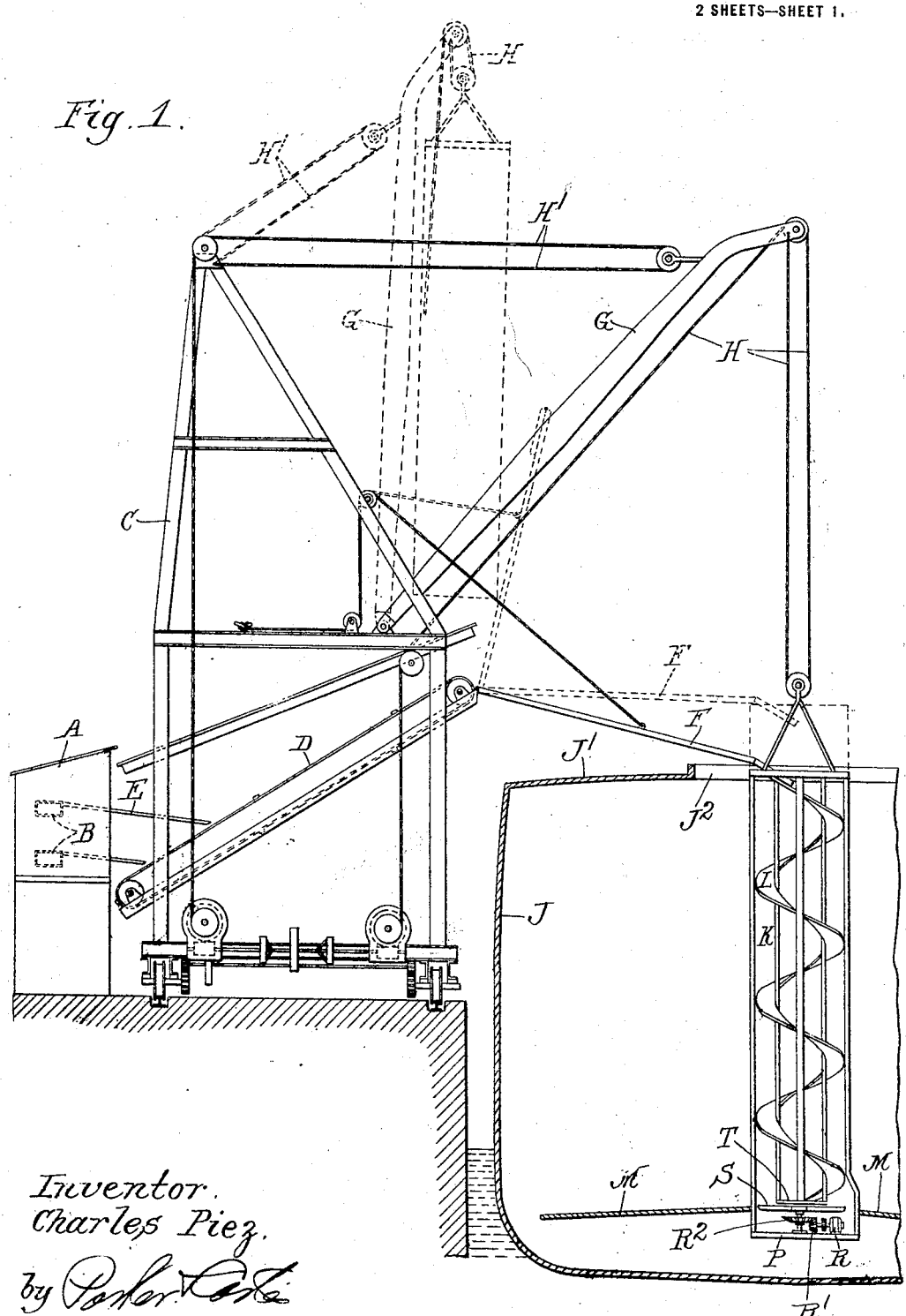

1,235,240.

Patented July 31, 1917.
2 SHEETS—SHEET 2.

Inventor
Charles Piez.
by
Attorneys

UNITED STATES PATENT OFFICE.

CHARLES PIEZ, OF CHICAGO, ILLINOIS, ASSIGNOR TO LINK-BELT COMPANY, OF CHICAGO, ILLINOIS, A CORPORATION OF ILLINOIS.

CONVEYING SYSTEM.

1,235,240. Specification of Letters Patent. Patented July 31, 1917.

Application filed June 5, 1915. Serial No. 32,260.

*To all whom it may concern:*

Be it known that I, CHARLES PIEZ, a citizen of the United States, residing at Chicago, in the county of Cook and State of Illinois, have invented a certain new and useful Improvement in Conveying Systems, of which the following is a specification.

My invention relates to a conveyer system for delivering packages from a wharf to a ship and distributing the same within the hold of the ship. One form of my device is illustrated in the accompanying drawings, wherein—

Figure 1 is a diagrammatic elevation of a complete system including my invention;

Like parts are indicated by the same letter in all the figures.

Figure 3:
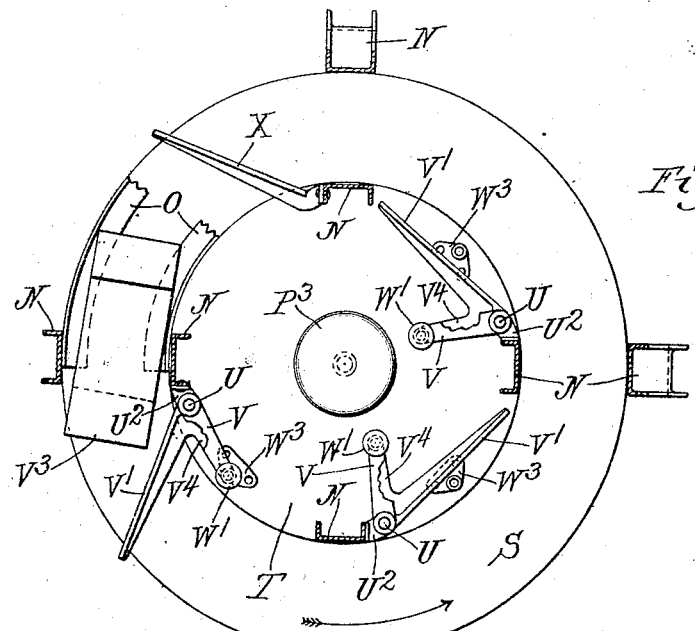
Fig. 3 is a plan view of such lower end.
Figure 2:
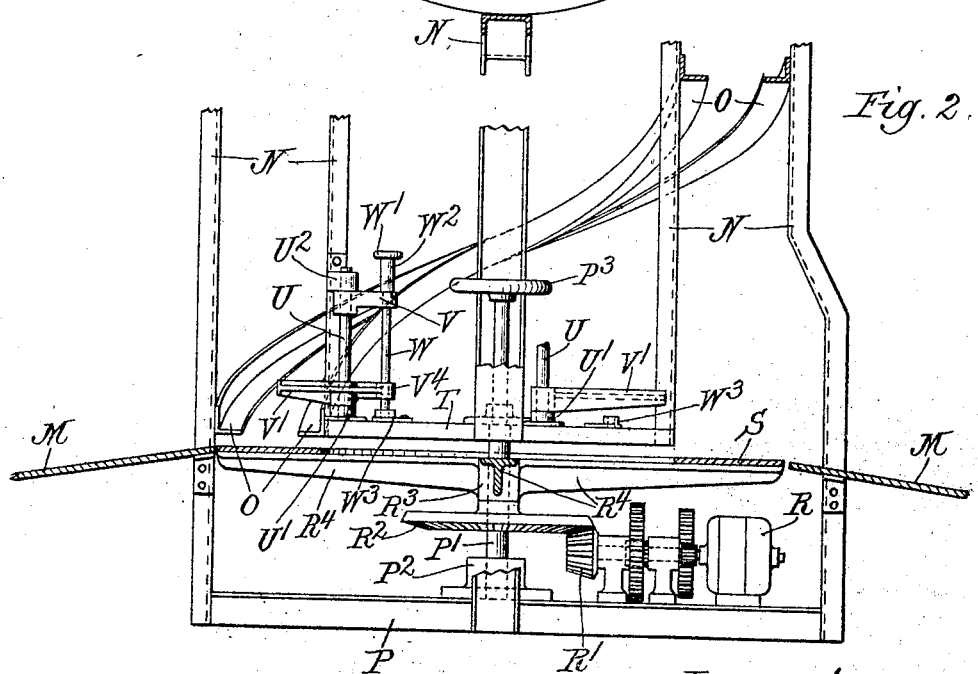
Fig. 2 is an enlarged cross section and part elevation view of the lower end of the vertical conveyer.

A is a wharf shed containing conveyer devices B, B whereby packages may be conveyed along the wharf and delivered at any part thereof. C is a traveling crane mounted in any desired manner on the wharf and adapted to travel therealong. It is equipped with the conveyer D adapted to receive from the conveyer B packages delivered over a chute E. This conveyer D delivers to a gravity conveyer F which is adapted to discharge to the vertical spiral conveyer hereinafter more fully described. The traveling crane may be equipped with any desired form of apparatus for operating it and for causing it to travel and for conveying the packages from the wharf conveyer to the vertical conveyer. It is also provided with a boom G from which is suspended by means of the ropes H the vertical conveyer. The traveling crane and the boom are equipped with apparatus, including the rope $H^1$, so that the vertical conveyer can be lifted to any desired height within the range of its action and swung into any desired position as indicated in dotted lines in Fig. 1. Here it is shown as elevated and out of operation. In full lines it is shown in operation.

J is the hull of a ship, $J^1$ the deck, $J^2$ one of the hatches. K is the framework of a preferably open cylindrical structure, which with the spiral chute L therein constitutes the vertical conveyer which is suspended by the rope H from the end of the boom. M, M are gravity conveyers associated with the lower portion of the vertical conveyer. These parts are all diagrammatically shown in Fig. 1.

N, N are vertical beams which together with the spirally arranged angle bars O, O, one or more suitable cross-beams P at the bottom, and a suitable connecting device at the top not herein shown in detail, constitute the vertical conveyer. This vertical conveyer can, of course, be made of any desired form, size, shape or proportion, the object being preferably by gravity to permit packages or objects to be delivered from the top of the spiral conveyer to the bottom.

In the bottom of the vertical conveyer and on the central axis thereof is a post $P^1$ in the block $P^2$ provided at its upper end with the seat $P^3$.

R is a motor driving the gear $R^1$ which meshes with the pinion $R^2$ mounted on the sleeve $R^3$ on the post $P^1$. Said sleeve is provided with arms $R^4$, $R^4$ on which is mounted an annular conveying table or shunting conveyer S. The motor is supplied with current controlled in any desired manner, but its purpose is to rotate the table S which is beneath the discharge end of the spiral chute or conveyer so that the packages delivered from the chute are carried away from its lower end by the table.

T is a platform suitably secured on the lower ends of the inner vertical beams N, N and carried thereby. It is centered on the post $P^1$. Mounted on the platform T is a series of hinge posts U, U preferably secured below in a block $U^1$ and above in a projection $U^2$ secured to one of the inner beams N. Secured on each hinge post so as to rotate therewith is an upper arm V and a lower elbow lever $V^1$. The long arm of the elbow lever $V^1$ projects above the table S and is inclined thereto so as to serve as a plow or to shunt packages such as the package $V^3$ from the table S. The short arm $V^4$ of the elbow lever and the arm V are perforated at their outer ends to permit the passage of the handle bar W, which has at its upper end the handle piece W¹ and an enlargement W² to limit its downward motion and at its lower end is associated with a latch block W³ on the platform T. X is a fixed plow member just beneath the lower end of the spiral chute.

It will further be understood that I have illustrated these several parts in a particular form of construction but without any idea of confining myself to the same, and in a sense I desire all the drawings to be taken as diagrammatical and illustrative of the broad idea.

The use and operation of my invention are as follows:

Assuming that a quantity of packages are to be delivered from a train to a dock and thence to the bottom of a ship, the operation will be as follows. The packages will be delivered at the proper point on the dock and supplied to the dock conveyer by which they will be carried along the dock to the point of discharge, which will be opposite the hatch of the ship to be loaded. Here the packages will be diverted in any convenient manner from the dock conveyer to the conveyer on the movable crane, and by that conveyer they will be raised or lowered as the case may be, and then discharged over the side of the ship or dock onto the conveyer, preferably a gravity conveyer, which will discharge them into the top of the vertical conveyer.

It will be assumed that the vertical conveyer has been lowered into position so that it passes down through the hatch to the lower level of the vessel where the packages are to be stored. These packages now begin to descend through or along the vertical conveyer. Here each package as it arrives is delivered on the annular conveyer table, and since this conveyer table is rotating the package is carried away from the lower end of the discharge chute. There will be distributed around this table a series of horizontal distributing conveyers, preferably slightly inclined gravity conveyers, and in ordinary practice there would be about four of them.

The operator in the center of the annular table will manipulate the plows at will so as to shunt any desired number of packages to any desired distributing conveyer whence they may be delivered to the points where they are required to fill or trim the load. Thus he may send ten packages from one side of the annular table in one direction, and seeing that the operation has gone forward he may then throw that plow out of operation, and in like manner the plow members on the opposite side of the annular table may be manipulated until ten or more packages have been there delivered.

As soon as the men who receive the packages from the extremity of the distributing conveyers have properly arranged them for the first loading level, the machinery will be stopped long enough to permit the vertical conveyer to be lifted a predetermined distance, whereupon the distributing conveyers will be placed in position for the next level of packages, and the operation will proceed as before until the loading at the hatch in question has been finished. Then the vertical conveyer can be dropped into the next hatch, the train being moved forward for that purpose, and the operation be duplicated.

The system comprises, therefore, a supply conveyer which brings the packages to the top of the vertical conveyer, a vertical conveyer to lower the packages onto the place where they are to be stored, an annular conveyer or, speaking more generally, a shunting conveyer and distributing conveyers between which and the vertical conveyer the shunting conveyer is operated.

Each one of these several elements in the system can of course be greatly varied without departing from the spirit of my invention.

I have spoken of vertical conveyer, and I mean by that term to include any conveyer which is adapted to take packages from a higher elevation and deliver them to a lower, or vice versa. The particular form which I have shown is a gravity conveyer whereby the packages are delivered from a higher to a lower point traveling around a vertical axis.

I claim:

1. A conveyer system comprising a spiral, vertical chute, means for supplying material to the upper end thereof, an annular, positively driven, distributing platform surrounding the lower end thereof, and arranged to receive material from the discharge end of the conveyer, a series of fixed discharge platforms arranged about the periphery of the distributing platform, and a series of separate controllable discharge arms, arranged one adjacent each fixed discharge platform and adapted at the will of the operator to extend across the respective surface of the annular distributing platform to deflect material sliding therealong onto the distributing platform.

2. A conveyer system comprising a vertically disposed conveyer, and means for supplying material to one end thereof, an annular, positively driven, distributing platform arranged about the conveyer adapted to receive material therefrom, a series of fixed discharge conveyers arranged about the periphery of the annular distributing platform, and means controlled by the operator and extending across the effective surface of the annular distributing platform for deflecting material therefrom onto the discharge conveyers.

In testimony whereof, I affix my signature in the presence of two witnesses this 1st day of June, 1915.

CHARLES PIEZ.

Witnesses:
  BESSIE S. RICE,
  MINNIE M. LINDENAU.